3,326,991
PROCESS FOR THE PREPARATION OF CONJUGATED CYCLOHEXADIENES
Masataka Amagasa, 15 Komegafukuro-uwacho, and Tadashi Yamaguchi, 66 Nakajima-cho, both of Sendai-shi, Miyagi-ken, Japan, and Morihisa Tanaka, 2 of 1726, 4-chome, Fukazawa-cho, Setagaya-ku, Tokyo, Japan
No Drawing. Filed May 12, 1965, Ser. No. 455,312
3 Claims. (Cl. 260—666)

The present invention relates to a process for the preparation of conjugated cyclohexadienes. More precisely, the present invention relates to a characteristic process, wherein alkali metal alcoholate is employed in a liquid ammonia solution as a catalyst and thereby conjugated cyclohexadiene is selectively prepared from unconjugated cyclohexadienes in accordance with the isomerization reaction.

Cyclohexadiene-1.3 has been considered as an extremely useful material in view of raw materials in the field of organic chemical industry, but a synthetic process which comprises the removal of hydrogen bromide from 1,2-dibromocyclohexane or 3-bromocyclohexene and several other resembled processes have been known. However, aforementioned processes are merely laboratory scale method and are not suitable for industrial use for the yield is very low.

Besides the aforementioned process, United States Patent No. 2,316,136 in which alkali metal alcoholate is employed as a catalyst, a reaction of isomerization is carried out at 100° C. or more of temperature in the presence or absence of alcohol and thereby cyclohexadiene-1,3 is prepared from cyclohexadiene-1,4, is publicly known at present. However, this process has not used liquid ammonia for the solvent and has a number of defects, i.e., high reaction temperature, long reaction time and low yield.

An industrial method for the preparation of conjugated alkylcyclohexadienes is also not yet discovered.

The present invention relates to a novel process of preparation wherein the defects on previous known process are improved and removed.

Previously, the inventors discovered such a process that cyclohexene is selectively prepared from benzene in a liquid ammonia solution, and filed a patent application on it. The present invention was discovered in connection with the said process.

The present invention is explained in detail in the following.

In accordance with the present invention, unconjugated cyclohexadienes are employed as a raw material. They are a number of compounds of example, unconjugated cyclohexadiene, i.e., cyclohexadiene-1,4; unconjugated monoalkylcyclohexadienes such as methylcyclohexadiene, ethylcyclohexadiene and propylcyclohexadiene; unconjugated dialkylcyclohexadienes such as dimethylcyclohexadiene, diethylcyclohexadiene, dipropylcyclohexadiene and the like; unconjugated trialkylcyclohexadienes such as trimethylcyclohexadiene, triethylcyclohexadiene, tripropylcyclohexadiene and the like.

In another word, cyclohexadiene-1,4 and unconjugated alkylcyclohexadienes, possessing one alkyl radical to three alkyl radicals, each of which consists of one carbon atom to four carbon atoms, are employed for raw materials in accordance with the present invention.

The aforesaid raw materials are employed in a solvent of liquid ammonia to cause a reaction of isomerization in the presence of a catalyst which consists of alkali metal alcoholate, and thereby conjugated alkylcyclohexadienes are prepared.

The amount of liquid ammonia employed is not particularly critical, the preferable range of the liquid ammonia being from about 0.5% to 1000% based on the volume of unconjugated cyclohexadiene.

All alkali metals including Li, Na, K and Cs can be employed for an alkali metal of alkali metal alcoholate namely for a catalyst, but in view of industrialization, sodium is preferably selected for this object.

All alcohols, namely any of lower alcohol or higher alcohol may be employed for an alcoholic component of alcoholate, but in view of practical use, lower alcohol such as methanol or ethanol is preferably employed.

The amount of the catalyst employed is not less than 1% based on the volume of unconjugated cyclohexadiene, preferably from 5% to 40%. The presence of alcoholate which is surplus to the solubility of unconjugated cyclohexadiene does not effect the present reaction.

The aforementioned catalyst can be recovered after the reaction is entirely terminated and can be employed repeatedly. The reaction temperature may be selected in a wider range from $-20°$ to $130°$ C.

In order to control the side reaction such as dehydrogenation or polymerization reaction, it is desired to select a reaction temperature at 100° C. or less. In view of the reaction velocity, it shall be chosen at 20° C. or more.

An additional pressure as well as a common atmospheric pressure can be feasibly employed for a reaction pressure. This reaction takes a homogeneous reaction or a non homogeneous reaction depending on an amount of liquid ammonia and a reaction temperature, but the reaction of isomerization is carried out very favorably in all cases.

In accordance with the present reaction, one of conjugated cyclohexadienes can be correspondingly prepared from one of aforementioned various raw materials.

The effects of present invention are cited out as follows:

(1) Conjugated cyclohexadienes can be selectively prepared.

(2) A low temperature is chosen for the present reaction and consequently side reaction such as dehydrogenation or polymerization reaction is not arouse, and thereby a high yield can be attained.

*Example I*

20 g. of liquid ammonia and 2 g. of ethanol were charged in a pressure resistant type of reactor and subsequently 1 g. of sodium was added in the aforesaid mixture whereby the ammonia solution of sodium ethylate were prepared. 3 g. of cyclohexadiene-1,4 were added in the ammonia solution of sodium ethylate and this mixture was stood for 60 hours maintaining the temperature at approximate 10° C. whereby isomerization reaction was carried out.

After the reaction was over, ammonia was recovered and water was added and thereby the mixture was separated into two layers. The oil layer was analyzed by gas chromatography. 2.0 g. of cyclohexadiene-1,3 were produced and the residue was cyclohexadiene-1,4. When the reaction was terminated, the liquid parts were entirely distilled off without adding water, whereby alcoholate was recovered and this was used for the aforesaid reaction repeatedly.

*Example II*

5 g. of liquid ammonia and 0.2 g. of ethanol were charged in a pressure resistant type of reactor and subsequently 0.1 g. of sodium was added in the mixture. Then 2 g. of cyclohexadiene-1,4 were added in the aforesaid mixture and isomerization reaction was carried out at 100° C. for 2 hours. When the reaction was terminated, the reaction mixture was treated similarly as Example I. 1.4 g. of cyclohexadiene-1,3 were produced therefrom, and the residue was unreacted cyclohexadiene-1,4.

Example III 60 g. of liquid ammonia and 2.4 g. of n-butanol were charged in a pressure resistant type of reactor, whereby subsequently 0.5 g. of sodium was added to prepare alcoholate, and then 10 g. of cyclohexadiene-1,4 were added in the aforesaid mixture and this mixture was stood for 20 hours maintaining the temperature at 20° C.

When the reaction was terminated, the reaction mixture was treated similarly as Example I.

3 g. of cyclohexadiene-1,3 were produced therefrom and the residue was unreacted cyclohexadiene-1,4.

Example IV 0.2 g. of methanol was taken in a pressure resistant type of reactor and 0.1 g. of sodium was added in methanol to prepare alcoholate. Subsequently, 8 g. of liquid ammonia and 1 g. of cyclohexadiene-1,4 was added in the aforesaid mixture in order and then isomerization reaction was carried out at 20° C. for 20 hours.

When the reaction was terminated, the reaction mixture was treated similarly as Example I. 0.6 g. of cyclohexadiene-1,3 was produced therefrom and the residue was unreacted cyclohexadiene-1,4.

Example V 7 g. of liquid ammonia and 0.2 g. of ethanol were charged in a pressure resistant type of reactor whereby subsequently 0.2 g. of potassium was added to prepare alcoholate and 1 g. of cyclohexadiene-1,4 was added to them. Subsequently isomerization reaction was carried out at 100° C. for 7 hours.

When the reaction was terminated, the reaction mixture was treated similarly as Example I. 0.7 g. of cyclohexadiene-1,3 was produced therefrom. The residue was unreacted cyclohexadiene-1,4.

Example VI 20 g. of liquid ammonia and 2 g. of ethanol were charged in a pressure resistant type of reactor and subsequently, 1 g. of sodium was added in the aforesaid mixture, whereby liquid ammonia solution of sodium ethylate was prepared. Then, 3 g. of 1-methylcyclohexadiene-1,4 were added in the aforesaid ammonia solution of sodium ethylate and this mixture was stood at 15° C. temperature for 20 hours whereby isomerization reaction was carried out.

When the reaction was terminated, ammonia was recovered and then water was added to the reaction mixture. Thus obtained water mixture was separated into two layers.

The oil layer was analyzed by gas chromatography and 2.1 g. of 1-methylcyclohexadiene-1,5 were produced therefrom, and the residue was unreacted 1-methylcyclohexadiene-1,4.

On the other hand, when the reaction was terminated, all liquid portions were distilled off without adding water, alcoholate was recovered and was used repeatedly.

Example VII 10 g. of liquid ammonia and 0.4 g. of ethanol were charged in a pressure resistant type of reactor and subsequently 0.2 g. of sodium was added in the aforesaid mixture. Then, 4 g. of 1-ethylcyclohexadiene-1,4 were added in the aforesaid mixture. Isomerization reaction was carried out at 100° C. for 2 hours.

When the reaction was terminated, the reaction mixture was treated similarly as Example I. 1.2 g. of 1-ethylcyclohexadiene-1,5 and 0.3 g. of 1-ethylcyclohexadiene-1,3 were produced therefrom.

The residue was unreacted 1-ethylcyclohexadiene-1,4.

Example VIII 10 g. of liquid ammonia and 0.15 g. of potassium methylate were charged in a pressure resistant type of reactor and subsequently 2 g. of 1,4-dimethylcyclohexadiene-1,4 was added in the aforesaid mixture, and thus obtained mixture was stood at 40° C. for 9 hours for isomerization reaction. When the reaction was terminated, ammonia was recovered and then water was added to the reaction mixture. Thus obtained water mixture was separated into two layer.

The oil layer was analyzed by gas chromatography and 1.2 g. of 1,4-dimethylcyclohexadiene-1,3 were produced therefrom and the residue was unreacted 1,4-dimethylcyclohexadiene-1,4.

We claim:

1. The process which comprises contacting (1) a compound selected from the group consisting of 1,4-cyclohexadiene and alkyl-substituted 1,4-cyclohexadiene having 1 to 3 alkyl radicals, each of which has 1 to 4 carbon atoms with (2) a catalyst which is a preformed alcoholate of sodium or potassium having 1 to 4 carbon atoms in the alcoholic component and substantially free of unreacted alcohol and alkali, in (3) liquid ammonia solvent at a temperature of 10 to 100° C. and recovering the corresponding compound selected from the group consisting of 1,3-cyclohexadiene and alkyl-substituted 1,3-cyclohexadienes having 1 to 3 alkyl radicals each of which has 1 to 4 carbon atoms.

2. A process according to claim 1 wherein liquid ammonia as a solvent is employed in the range of 0.5% to 1000% based on the volume of 1,4-cyclohexadiene.

3. A process according to claim 1 wherein the alcoholate as a catalyst is employed in the range of 5% to 40% based on the volume of 1,4-cyclohexadiene.

References Cited

UNITED STATES PATENTS

| | | | |
|---|---|---|---|
| 2,182,242 | 12/1939 | Wooster | 260—666 |
| 2,316,136 | 4/1943 | Turnbull | 260—666 |
| 3,124,621 | 3/1964 | Crain et al. | 260—666 |

OTHER REFERENCES

A. J. Birch, J. Chem. Soc., 430 (1944).

A. P. Krapcho et al., J. Am. Chem. Soc., vol. 81, pp. 3658–3666, 1959.

DELBERT E. GANTZ, *Primary Examiner.*

V. O'KEEFE, *Assistant Examiner.*